(12) United States Patent
Bartlok

(10) Patent No.: US 11,415,084 B2
(45) Date of Patent: Aug. 16, 2022

(54) STORAGE TANK FOR CRYOGENIC LIQUID GAS

(71) Applicant: MAGNA STEYR Fahrzeugtechnik AG & Co KG, Graz (AT)

(72) Inventor: Guido Bartlok, Graz (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 284 days.

(21) Appl. No.: 16/718,481

(22) Filed: Dec. 18, 2019

(65) Prior Publication Data

US 2020/0325854 A1 Oct. 15, 2020

(30) Foreign Application Priority Data

Apr. 9, 2019 (EP) .................................... 19168209

(51) Int. Cl.
*F02M 21/02* (2006.01)
*B60K 15/03* (2006.01)
(Continued)

(52) U.S. Cl.
CPC ... *F02M 21/0221* (2013.01); *B60K 15/03006* (2013.01); *F02D 19/022* (2013.01);
(Continued)

(58) Field of Classification Search
CPC .......... F02M 21/0221; B60K 15/03006; B60K 2015/03026; F02D 19/022; F02D 19/027;
(Continued)

(56) References Cited

U.S. PATENT DOCUMENTS

2006/0042273 A1 3/2006 Morris et al.
2007/0261552 A1 11/2007 Arnold et al.
(Continued)

FOREIGN PATENT DOCUMENTS

CA 2860682 A1 10/2014
CN 201161923 Y 12/2008
(Continued)

OTHER PUBLICATIONS

European Search Report for European Patent Application No. 19168209.5, dated Oct. 16, 2019, 4 pages.
(Continued)

*Primary Examiner* — Hai H Huynh
(74) *Attorney, Agent, or Firm* — Jordan IP Law, LLC; Todd A. Vaughn

(57) ABSTRACT

A storage container includes an inner tank to store a cryogenic liquid gas and an extraction system to permit extraction of the cryogenic liquid gas by a cryogenic liquid gas consumer. The extraction system includes an extraction line, a consumer line to facilitate extraction of the cryogenic liquid gas by the cryogenic liquid gas consumer, a return line to facilitate return of the cryogenic liquid gas to the inner tank, a heat transmitter to heat the cryogenic liquid gas extracted from the inner tank and transfer the cryogenic liquid gas to a gaseous phase, and a compressor to compress the gaseous cryogenic liquid gas. A first flow of the compressed cryogenic liquid gas is conducted to the cryogenic liquid gas consumer via the consumer line and a second flow of the compressed cryogenic liquid gas is returned to the inner tank via the return line.

18 Claims, 2 Drawing Sheets

(51) Int. Cl.
*F02D 19/02* (2006.01)
*F17C 7/04* (2006.01)

(52) U.S. Cl.
CPC .............. *F02D 19/027* (2013.01); *F17C 7/04* (2013.01); *B60K 2015/03026* (2013.01); *F17C 2205/0335* (2013.01); *F17C 2205/0338* (2013.01); *F17C 2223/0161* (2013.01); *F17C 2223/033* (2013.01); *F17C 2227/0302* (2013.01); *F17C 2265/066* (2013.01)

(58) Field of Classification Search
CPC .... F17C 7/02; F17C 7/04; F17C 1/005; F17C 13/02; F17C 13/04; F17C 2205/0335; F17C 2205/0338; F17C 2205/0326; F17C 2205/0332; F17C 2223/0161; F17C 2223/033; F17C 2227/0302; F17C 2227/0107; F17C 2227/0157; F17C 2227/04; F17C 2265/066; F17C 2201/056; F17C 2221/102; F17C 2221/03; F17C 2270/0157; F17C 2270/0178; Y02E 60/32

USPC .... 123/525, 3, 510, 511, 514, 543; 220/4.14
See application file for complete search history.

(56) References Cited

U.S. PATENT DOCUMENTS

2013/0228151 A1 9/2013 Dunn et al.
2014/0096539 A1 4/2014 Gustafson et al.

FOREIGN PATENT DOCUMENTS

| CN | 103953848 A | 7/2014 |
|---|---|---|
| CN | 104390125 A | 3/2015 |
| CN | 204647843 U | 9/2015 |
| CN | 204756429 U | 11/2015 |
| CN | 108679438 A | 10/2018 |
| DE | 10321213 A1 | 12/2003 |
| DE | 102006031860 A1 | 1/2007 |

OTHER PUBLICATIONS

China National Intellectual Property Administration Search Report for Patent Application No. 202010078502.1, dated Jun. 3, 2001.

STORAGE TANK FOR CRYOGENIC LIQUID GAS

CROSS-REFERENCE TO RELATED APPLICATIONS

The present application claims priority 35 U.S.C. § 119 to European Patent Publication No. EP 19168209.5 (filed on Apr. 9, 2019), which is hereby incorporated by reference in its complete entirety.

TECHNICAL FIELD

Embodiments relate to a storage container for cryogenic liquid gas, with an inner tank for storing the cryogenic liquid gas, and an extraction system. Embodiments also relate to a motor vehicle comprising such a storage container.

BACKGROUND

Storage containers for deep-cooled liquid gas, in particular, for cryogenic liquid gas, are known in themselves. Such storage containers are used particularly in motor vehicle construction for providing fuel, for example, hydrogen, for operating a drive motor of a motor vehicle. The fuel may be converted into drive energy, for example, by an internal combustion engine or via a fuel cell and an electric motor.

As well as the general problems associated with storage and handling of cryogenic media, further problems arise, in particular, for mobile use. For example, in connection with the necessary change in quantity of the extracted gas occurring often very rapidly during driving operation, and with the associated need to maintain at a constant level the pressure prevailing in the storage container, in particular, should this must not fall below a specific value necessary to sustain driving operation.

The operating pressure inside such a storage container or its inner tank must normally be greater than the supply pressure for a consumer connected to the storage container. However, a high pressure in the inner container reduces the useful storage capacity of the inner container, since the density of a cryogenic liquid gas diminishes as the pressure rises.

Because of various technical challenges, in modern tank systems for liquid gas it is usual for the tank systems to be refined rather in the direction of lower operating pressures, whereas the operating pressures required by consumers of the liquid gas are generally rising.

It is also known, for extraction from the storage container, to increase the pressure in the interior thereof; this is normally achieved by heating the container contents either using external energy or by a heat transmitter or heat exchanger arranged in the storage container, through which already vaporised gas may flow. The piping necessary for this must be conducted through the container walls, which increases the costs of production and increases the undesirable heat incidence on stoppage of the vehicle ("evaporation losses"). A pressure buildup in the container is possible only with simultaneous extraction for the consumer of the liquid gas. In practice, this means that after filling, which takes place at a pressure lying below the operating pressure— initially only very small quantities can be supplied to the consumer.

SUMMARY

Embodiments relate to a storage container for cryogenic liquid gas for high operating pressures, and a motor vehicle comprising such a storage container. The storage container may comprise an inner tank defining a space for storage of the cryogenic liquid gas; and an extraction system provided such that a high operating pressure for a consumer device or system of the liquid gas is provided and large quantities of the cryogenic liquid gas may be extracted from the inner tank.

In accordance with embodiments, a storage container for cryogenic liquid gas may comprise an inner tank defining a space for storing the cryogenic liquid gas; an extraction system that comprises an extraction line which extends into the space of the inner tank and is fluidically connected to a consumer line and a return line at a branch point, to thereby facilitate extraction of the cryogenic liquid gas by a user/consumer in at least largely a liquid state and also return of the cryogenic liquid gas to the inner tank in at least largely a liquid state; a heat transmitter arranged in the extraction line upstream of the branch point to heat the cryogenic liquid gas extracted from the inner tank and transfer the cryogenic liquid gas to the gaseous phase; a compressor arranged in the extraction line upstream of the branch point and downstream of the heat transmitter to compress the gaseous cryogenic liquid gas, wherein a first partial flow/stream of the compressed cryogenic liquid gas is to be conducted to the consumer via the consumer line and a second partial flow/stream of the compressed cryogenic liquid gas is to be returned to the inner tank via the return line.

In accordance with embodiments, a storage container comprises an extraction system, to which a heat transmitter and a compressor are arranged upstream of a branch point, i.e., an element (e.g., a T-connector) which allows division of the fluid stream into two partial streams. The branch point can conduct the gas treated by the heat transmitter and compressor, respectively, both to the consumer via the consumer line and also back to the inner tank via the return line.

In accordance with embodiments, the heat transmitter is to heat the cryogenic liquid gas extracted from the inner container in order to transfer the cryogenic liquid gas completely to the gaseous phase.

In accordance with embodiments, the compressor, arranged downstream of the heat transmitter, is to compress the heated gas in order that it may be conveyed to the consumer at least largely in a liquid state, and return a partial stream to the inner tank, in at least largely a gaseous state, in order to guarantee an adequate extraction of the cryogenic liquid gas.

In accordance with embodiments, in such a design of a storage container, the typical tank operating pressure may be less than the operating pressure available to a consumer. Embodiments always offers a solution independently of operating pressure requirements, should the internal tank pressure or the pressure of the extracted medium is less than (e.g., for operational reasons, or due to fluctuating internal tank pressures as a result, e.g., of continuous evacuation) the pressure of the medium or the gaseous medium or cryogenic liquid gas required by the consumer.

In accordance with embodiments, the term "liquid gas" as used herein is to mean a medium which is gaseous at normal pressure and normal temperature, but which may move to a liquid state by cooling and/or compression and may be stored at least partially in the liquid state in the storage container. The liquid gas, i.e., the stored medium, may be present both in gaseous state and in liquid state during processing, in particular during extraction and return.

In accordance with embodiments, the compressor is configured to compress the gas to a pressure which is greater than the pressure of the liquid gas in the inner tank, or greater than the internal tank pressure.

In accordance with embodiments, the storage container may further comprise a pressure reducer arranged in the return line.

In accordance with embodiments, the storage container may further comprise a pressure safety valve arranged in the return line downstream of the pressure reducer.

In accordance with embodiments, a motor vehicle comprises a storage container as described hereinabove and a consumer, wherein the consumer is connected to the consumer line so that gas can be extracted by the consumer via the consumer line.

In accordance with embodiments, a motor vehicle comprises a cooling fluid circuit, including but not limited to, a cooling water circuit, wherein the cooling fluid circuit is configured to cool the consumer and also supply heat to the heat transmitter. The heat stream for the heat transmitter may therefore be provided by a cooling water circuit of the consumer, in particular, a fuel cell.

DRAWINGS

Embodiments will be illustrated by way of example in the drawings and explained in the description below.

DESCRIPTION

Figure 1:
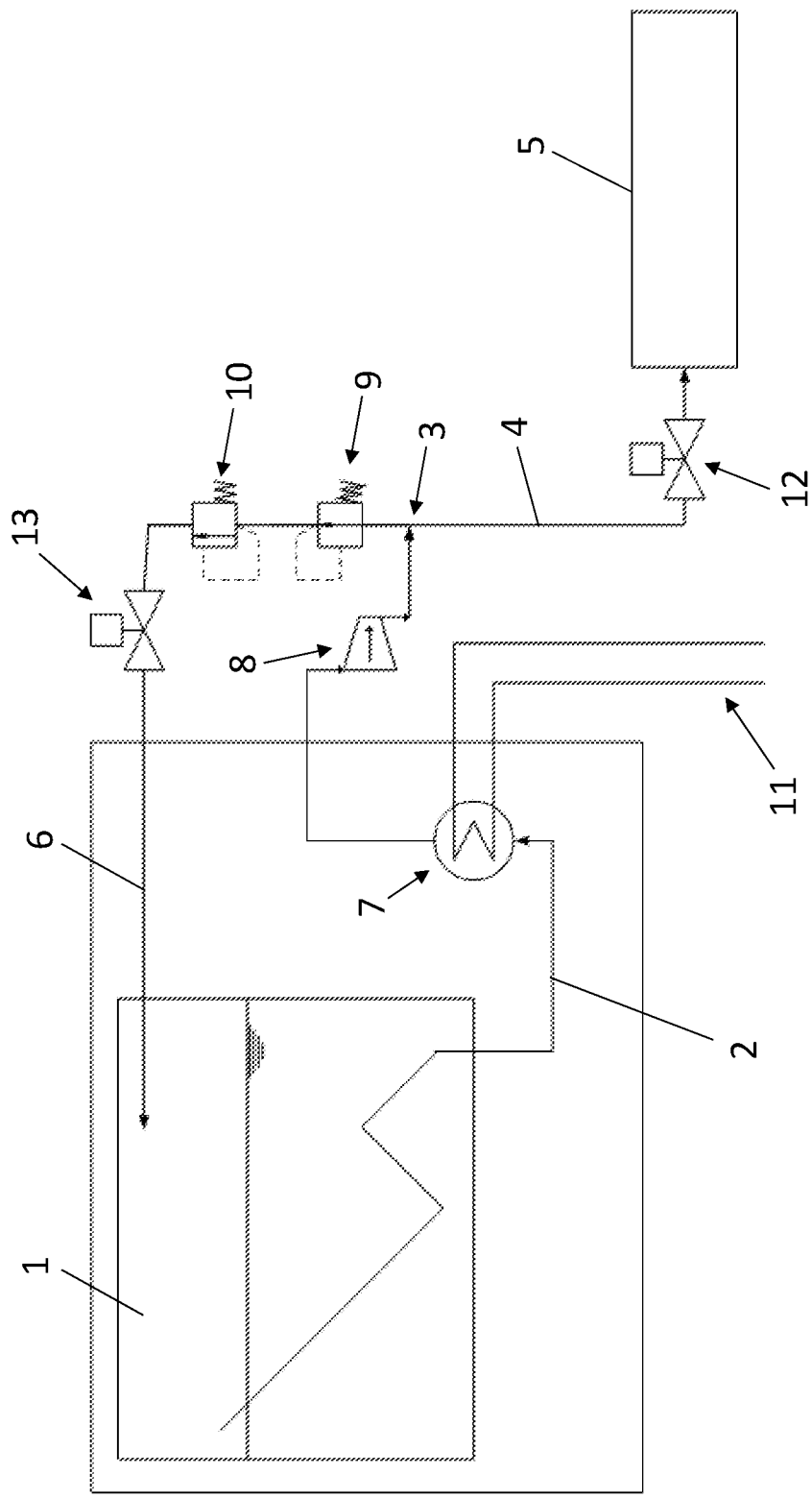
FIG. 1 illustrates a diagrammatic depiction of a storage container, in accordance with embodiments.

FIG. 1 illustrates an embodiment of a storage container for cryogenic liquid gas. The storage container comprises an inner tank 1 defining a space to store the cryogenic liquid gas, and an extraction system or device that comprises an extraction line 2 which extends into the inner tank 1.

At a first distal end thereof the extraction line 2 has an opening which is fluidically connected to the inner tank 1 to facilitate receipt of, for example, at least a gaseous medium for flow through the extraction line 2. A second distal end of the extraction line 2 has a bore hole which is also fluidically connected to the inner tank 1 to facilitate receipt of at least a liquid medium for flow through the extraction line 2. The extraction line 2 is fluidically connected to a consumer line 4 at a branch point 3. Because the consumer line 4 is fluidically connected to a consumer 5, a liquid gas may be extracted from the inner tank 1 by the consumer 5 via the consumer line 4. The extraction line 2 is also fluidically connected to a return line 6 at the branch point 3. Because the return line 4 is fluidically connected to the inner tank 1, a gaseous medium can be returned to the inner tank 1 via the return line 6.

A heat transmitter 7 is arranged in the extraction line 2 upstream of the branch point 3 to heat liquid gas that is extracted from the inner tank 1 is completely transferred to the gaseous phase. A power-controlled compressor 8 is arranged in the extraction line 2 upstream of the branch point 3 and downstream of the heat transmitter 7. The compressor 8 is configured to compress the gas to a density which is greater than in the inner tank 1. A partial stream or flow of the compressed gas is then conducted to the consumer 5 via the consumer line 4, while another partial stream of the compressed gas is returned to the inner tank 1 via the return line 6.

A pressure reducer 9 is arranged in the return line 6 downstream of the branch point 3 in order to limit or otherwise reduce the pressure of the gas returned to the inner tank 1. A pressure safety valve 10 is also arranged in the return line 6 downstream of the pressure reducer 9. A first shut-off valve 12 is arranged in the consumer line 4 downstream of the branch point 3 and upstream of the consumer 5. In particular, the first shut-off valve 12 is arranged at connection region for the consumer 5. A second shut-off valve 13 is arranged in the return line 6 downstream of the branch point 3, the pressure reducer 9, and the pressure safety valve 10.

A cooling fluid circuit 11 is provided to cool the consumer 5 and also supply heat to the heat transmitter 7. Thus, a cryogenic gas or a cryogenic liquid may be extracted from the inner tank 1 and conducted across the heat transmitter 7.

In operation, due to a heat supply via cooling water of the consumer 5, the cryogenic gas or the cryogenic liquid is completely transferred to the gaseous phase and also heated sufficiently for the consumer 5. The power-controlled compressor 8 then compresses the gas and conveys it to the consumer 5 under a pressure that is greater than that in the inner tank 1. In order to increase the pressure in the inner tank 1 in targeted fashion, or to allow the extraction of gas or liquid, gas is transferred back to the inner tank 1 via the second shut-off valve 13. In order to limit the pressure for the gas returned to the inner tank 1, if necessary, the pressure reducer 9 with downstream pressure safety valve 10 may be fitted.

Figure 2:
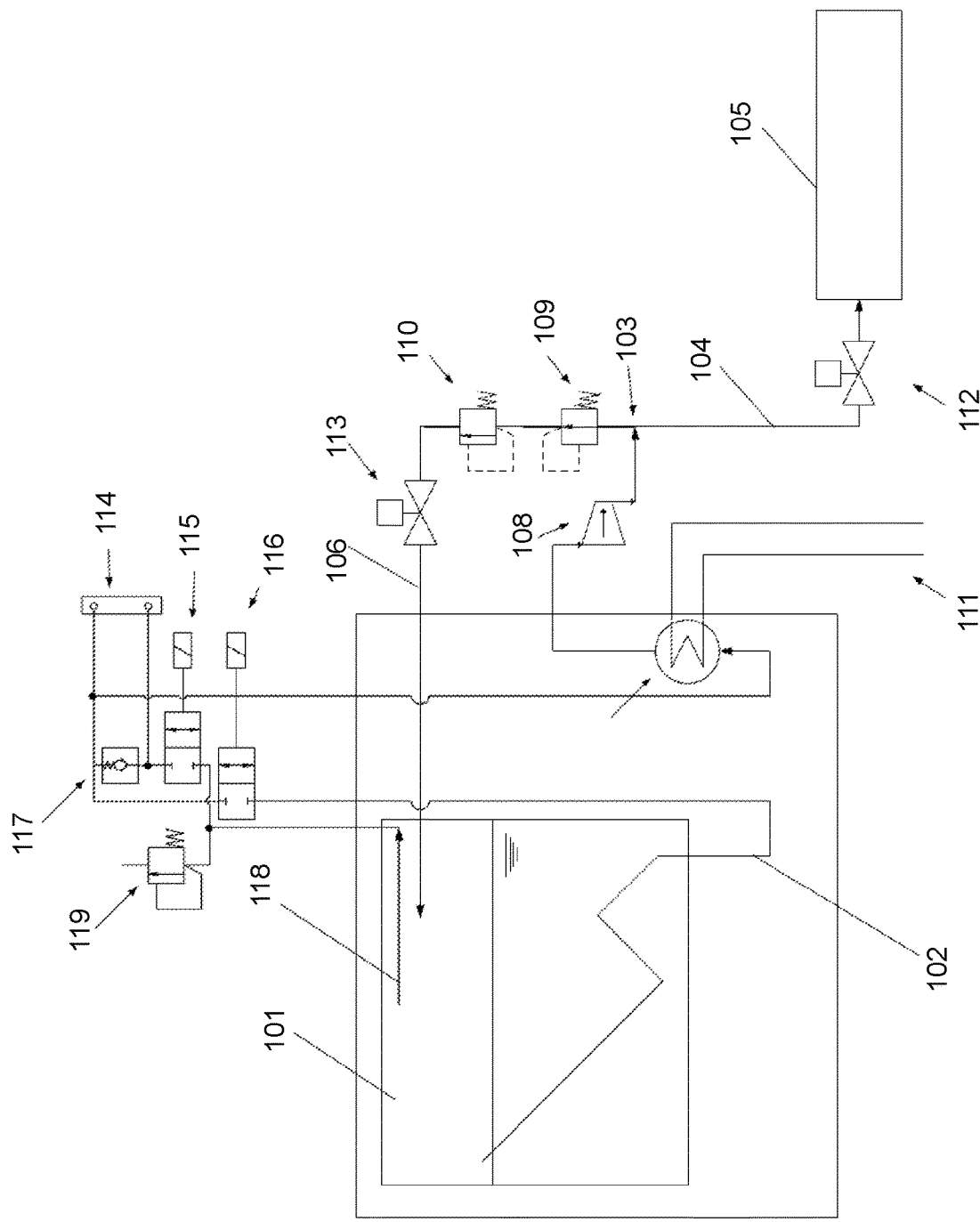
FIG. 2 illustrates a diagrammatic depiction of a storage container, in accordance with embodiments.

FIG. 2 illustrates another embodiment, in which the storage container includes an additional extraction and safety line 118 via which only gas can be extracted from the container. For this, a gas shut-off valve 115 is actuated, or via the extraction and safety line 118 and the now fluid-conductive valve 115, gas can be taken from the inner tank 101 and conducted to the heat transmitter 107. Alternatively or additionally, the tank system or storage container may have a shut-off valve 116 in the extraction line 102. The shut-off valve 116 is to control the extraction of liquid gas from the inner tank 101 via the extraction line 102, or further conduct the liquid gas to the heat transmitter 107. If both shut-off valves 115 and 116 are present in the tank system, it is now possible to extract medium from the inner tank 101 in a more targeted fashion according to a power demand, the internal tank pressure, a preceding tank event, etc. Should, for example, the vehicle has been stationary or is in a warm environment for a lengthy period of time, the pressure in the inner tank 101 may increase too greatly, in particular, to a threshold above the operating pressure of the tank. When the vehicle is in an operating state, it is advantageous for the system, when fuel is extracted in gaseous form from the inner tank 101 via the shut-off valve 115 and the extraction line 118 or is conducted to the heat transmitter 107. The procedure is similar should, for example, the internal pressure is greater but the driver is planning a refuelling stop in a short period of time. In this situation, it is also recommended to reduce the tank pressure during travel by extracting gas via the extraction line 118.

On the other hand, a high internal tank pressure may be used to drive the compressor 108 with lower power, but nonetheless still provide the consumer 105 with liquid gas at the high operating pressure required by the consumer 105, and thus, save energy. In accordance with embodiments, gas is extracted via the extraction line 118 with the shut-off valve 115 in an open state. Should, however, the consumer 105 have a high power demand and/or the internal tank pressure is low, it is recommended to close the shut-off valve 115 and open the shut-off valve 116, and in this case, extract liquid gas via the extraction line 102 and conduct it across the heat transmitter 107.

To protect the tank, a safety valve 119 which trips at over-pressure is provided at the extraction line 118. To complete the storage container, i.e., the tank system of the motor vehicle, in the embodiment of FIG. 2, a filling coupling 114 is also provided which allows the inner tank 101 to be filled via the shut-off valves 115 and 116 and the extraction lines 102 and 118. So that higher internal tank pressures are not balanced out via the filling coupling 114 or conducted into the environment via the filling coupling 114, a check valve 117 is arranged between the extraction line 118 and the filling coupling 114.

The terms "coupled," "attached," "fastened," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SYMBOLS 1, 101 Inner tank
2, 102 Extraction line
3, 103 Branch point
4, 104 Consumer line
5, 105 Consumer
6, 106 Return line
7, 107 Heat transmitter
8, 108 Compressor
9, 109 Pressure reducer
10, 110 Pressure safety valve
11, 111 Cooling fluid circuit
12, 112 First shut-off valve
13, 113 Second shut-off valve
114 Filling coupling
115 Gas shut-off valve
116 Liquid shut-off valve
117 Check valve
118 Extraction and safety line
119 Safety valve

What is claimed is:

1. A storage container for cryogenic liquid gas, comprising:
an inner tank defining a space to store the cryogenic liquid gas; and
an extraction system fluidically connected to the inner tank, the extraction system including:
an extraction line having a first end thereof fluidically connected to the inner tank and a second end thereof fluidically connected to a branch point,
a consumer line, having a first end thereof fluidically connected to the branch point and a second end thereof fluidically connected to a cryogenic liquid gas consumer, to facilitate extraction of the cryogenic liquid gas by the cryogenic liquid gas consumer,
a return line, having a first end thereof fluidically connected to the branch point and a second end thereof fluidically connected to the inner tank, to facilitate return of the cryogenic liquid gas to the inner tank,
a heat transmitter, arranged in the extraction line upstream of the branch point, to heat the cryogenic liquid gas extracted from the inner tank and transfer the cryogenic liquid gas to a gaseous phase,
a compressor, arranged in the extraction line upstream of the branch point and downstream of the heat transmitter, to compress the gaseous cryogenic liquid gas, wherein a first flow of the compressed cryogenic liquid gas is conducted to the cryogenic liquid gas consumer via the consumer line and a second flow of the compressed cryogenic liquid gas is returned to the inner tank via the return line.

2. The storage container of claim 1, wherein the compressor is configured to compress the cryogenic liquid gas to a pressure which is greater than a pressure of the cryogenic liquid gas in the inner tank.

3. The storage container of claim 1, wherein the extraction system further includes a pressure reducer, arranged in the return line downstream of the branch point, to reduce the pressure of the cryogenic liquid gas being returned to the inner tank.

4. The storage container of claim 3, wherein the extraction system further includes a pressure safety valve, arranged in the return line downstream of the pressure reducer.

5. The storage container of claim 1, further comprising a cooling fluid circuit, operatively connected to the heat transmitter, to cool the cryogenic liquid gas consumer and also supply heat to the heat transmitter.

6. A storage container for cryogenic liquid gas, comprising:
an inner tank defining a space to store the cryogenic liquid gas; and
an extraction system fluidically connected to the inner tank, the extraction system including:
an extraction and safety line, having a first end thereof fluidically connected to the inner tank and a second end thereof fluidically connected to a branch point, to facilitate extraction of only substantially gaseous cryogenic liquid gas from the inner tank,
an extraction line, having a first end thereof fluidically connected to the inner tank and a second end thereof fluidically connected to the extraction and safety line,
a consumer line, having a first end thereof fluidically connected to the branch point and a second end thereof fluidically connected to a consumer of the cryogenic liquid gas, to facilitate extraction of the cryogenic liquid gas by the consumer,
a return line, having a first end thereof fluidically connected to the branch point and a second end thereof fluidically connected to the inner tank, to facilitate return of the cryogenic liquid gas to the inner tank,
a heat transmitter, arranged in the extraction line upstream of the branch point, to heat the cryogenic liquid gas extracted from the inner tank and transfer the cryogenic liquid gas to a gaseous phase,
a compressor, arranged in the extraction line upstream of the branch point and downstream of the heat transmitter, to compress the gaseous cryogenic liquid gas, wherein a first flow of the compressed cryogenic liquid gas is conducted to the consumer via the consumer line and a second flow of the compressed cryogenic liquid gas is returned to the inner tank via the return line.

7. The storage container of claim 6, wherein the extraction and safety line is fluidically connected to the extraction line upstream of the heat transmitter.

8. The storage container of claim 6, wherein the extraction system further includes a first shut-off valve in the extraction and safety line and/or a second shut-off valve arranged in the extraction line.

9. The storage container of claim 8, wherein the extraction system further includes a filling coupling, fluidically connected to the extraction and safety line and/or the extraction line, to facilitate filling of the inner tank.

10. The storage container of claim 6, wherein the compressor is configured to compress the cryogenic liquid gas to a pressure which is greater than a pressure of the cryogenic liquid gas in the inner tank.

11. The storage container of claim 6, wherein the extraction system further includes a pressure reducer, arranged in the return line downstream of the branch point, to reduce the pressure of the cryogenic liquid gas being returned to the inner tank.

12. The storage container of claim 11, wherein the extraction system further includes a pressure safety valve, arranged in the return line downstream of the pressure reducer.

13. The storage container of claim 6, further comprising a cooling fluid circuit, operatively connected to the heat transmitter, to cool the cryogenic liquid gas consumer and also supply heat to the heat transmitter.

14. A motor vehicle, comprising:
  an inner tank defining a space to store the cryogenic liquid gas;
  a cryogenic liquid gas consumer; and
  an extraction system fluidically connected to the inner tank, the extraction system including:
    an extraction line having a first end thereof fluidically connected to the inner tank and a second end thereof fluidically connected to a branch point,
    a consumer line, having a first end thereof fluidically connected to the branch point and a second end thereof fluidically connected to the cryogenic liquid gas consumer, to facilitate extraction of the cryogenic liquid gas by the cryogenic liquid gas consumer,
    a return line, having a first end thereof fluidically connected to the branch point and a second end thereof fluidically connected to the inner tank, to facilitate return of the cryogenic liquid gas to the inner tank,
    a heat transmitter, arranged in the extraction line upstream of the branch point, to heat the cryogenic liquid gas extracted from the inner tank and transfer the cryogenic liquid gas to a gaseous phase,
    a compressor, arranged in the extraction line upstream of the branch point and downstream of the heat transmitter, to compress the gaseous cryogenic liquid gas, wherein a first flow of the compressed cryogenic liquid gas is conducted to the cryogenic liquid gas consumer via the consumer line and a second flow of the compressed cryogenic liquid gas is returned to the inner tank via the return line.

15. The motor vehicle of claim 14, wherein the compressor is configured to compress the cryogenic liquid gas to a pressure which is greater than a pressure of the cryogenic liquid gas in the inner tank.

16. The motor vehicle of claim 14, wherein the extraction system further includes a pressure reducer, arranged in the return line downstream of the branch point, to reduce the pressure of the cryogenic liquid gas being returned to the inner tank.

17. The storage container of claim 16, wherein the extraction system further includes a pressure safety valve, arranged in the return line downstream of the pressure reducer.

18. The storage container of claim 14, further comprising a cooling fluid circuit, operatively connected to the heat transmitter, to cool the cryogenic liquid gas consumer and also supply heat to the heat transmitter.

\* \* \* \* \*